United States Patent [19]

Huhnke

[11] Patent Number: 5,046,202
[45] Date of Patent: Sep. 10, 1991

[54] WATER-SAVING TANK CONSTRUCTION, ATTACHMENT AND METHOD FOR FLUSH TOILETS

[76] Inventor: Beverley M. Huhnke, 1623 Palm Ave., Everett, Wash. 98203

[21] Appl. No.: 508,770

[22] Filed: Apr. 12, 1990

[51] Int. Cl.$^5$ .............................................. E03D 1/00
[52] U.S. Cl. ........................................ 4/415; 137/426
[58] Field of Search .................. 4/415, 661, DIG. 1; 137/425, 426

[56] References Cited

U.S. PATENT DOCUMENTS

| | | | |
|---|---|---|---|
| 4,032,997 | 7/1977 | Phripp et al. | 4/415 |
| 4,091,474 | 5/1978 | Makhobey | 4/379 |
| 4,167,951 | 9/1979 | Hume | 4/415 X |
| 4,266,304 | 5/1981 | Kohrn et al. | 4/415 |
| 4,455,694 | 6/1984 | Dymon | 4/325 |
| 4,536,900 | 8/1985 | Hayes | 4/324 |
| 4,849,742 | 7/1989 | Warrington | 4/661 X |
| 4,854,340 | 8/1989 | Pavlik | 4/415 X |
| 4,868,933 | 9/1989 | Chen | 4/415 X |

Primary Examiner—Charles E. Phillips
Attorney, Agent, or Firm—Ward Brown; Robert W. Beach

[57] ABSTRACT

A buoyant block of rigid material is positioned beneath the float of a water supply valve in the toilet tank of a flush toilet so as to maintain the float a predetermined level above the surface of water in the tank. The float determines the level to which the tank is refilled following flushing of the toilet. Consequently, after flushing, the tank is refilled to a lower level than it otherwise would be if the block were removed, and at the next flush a lesser quantity of water is discharged from the tank to the toilet bowl for conserving the amount of water used by the flush toilet.

4 Claims, 2 Drawing Sheets

WATER-SAVING TANK CONSTRUCTION, ATTACHMENT AND METHOD FOR FLUSH TOILETS

BACKGROUND OF THE INVENTION

1. Field of the Invention

The present invention relates to the general field of water-saving systems for flush toilets and, more specifically, to water-saving tank modifications.

2. Prior Art

It is known that many flush toilets release a considerably greater amount of water from the tank or reservoir to the bowl than is necessary to evacuate the bowl effectively; and a variety of modifications have been proposed for reducing the amount of water released at each flush. For example, the following U.S. patents disclose different types of attachments designed to close the outlet valve of a toilet tank prematurely so as to decrease the amount of water discharged from the tank into the bowl:

Phripp et al. U.S. Pat. No. 4,032,997, issued July 5, 1977;
Makhobey U.S. Pat. No. 4,091,474, issued May 30, 1978;
Hayes U.S. Pat. No. 4,536,900, issued Aug. 27, 1985;
Dymon U.S. Pat. No. 4,455,694, issued June 26, 1984.

Despite past efforts, the problem of water wastage by flush toilets remains largely unsolved, particularly for flush toilets of older designs.

SUMMARY OF THE INVENTION

The principal object of the present invention is to provide a novel toilet tank system for a tank of the type having a water-supply valve controlled by the position of a float for refilling the toilet tank to a predetermined level as determined by the position of the float, which system effectively reduces the amount of water discharged from the toilet tank at each flush.

It also is an object to provide such a system in a form adaptable for toilet tanks of a variety of different designs without requiring modification of the standard tank components.

Another object is to provide such a system utilizing an attachment or add-on component which is of simple and inexpensive construction.

An additional object is to provide such a system utilizing an attachment or add-on component which is easy to install, even by unskilled home owners, yet durable and reliable over a long period of use.

In the preferred embodiment of the present invention, the foregoing objects are accomplished by providing a block of buoyant material positioned beneath the float of the water supply valve such that the float is maintained a predetermined distance above the surface of the water in the toilet tank. Consequently, the predetermined level of water in the tank to which the tank is refilled after flushing is reduced and, upon opening of the outlet valve, the amount of water discharged from the tank into the bowl will be correspondingly decreased.

The block of buoyant material can be of a width slightly less than the internal width of the toilet tank so as to be positioned approximately centrally of the tank directly below the float. Buttons of smooth material can be provided at opposite sides of the block to assure easy sliding engagement of the block against the sidewalls of the tank.

If required in order to maintain the block centered beneath the float of the water supply valve, the top surface of the block can have a central concave depression for receiving the convex exterior of the float, the block can be tethered to an end wall of the toilet tank or the upper surface of the block can be affixed to the underside of the float.

DETAILED DESCRIPTION

Figure 1:
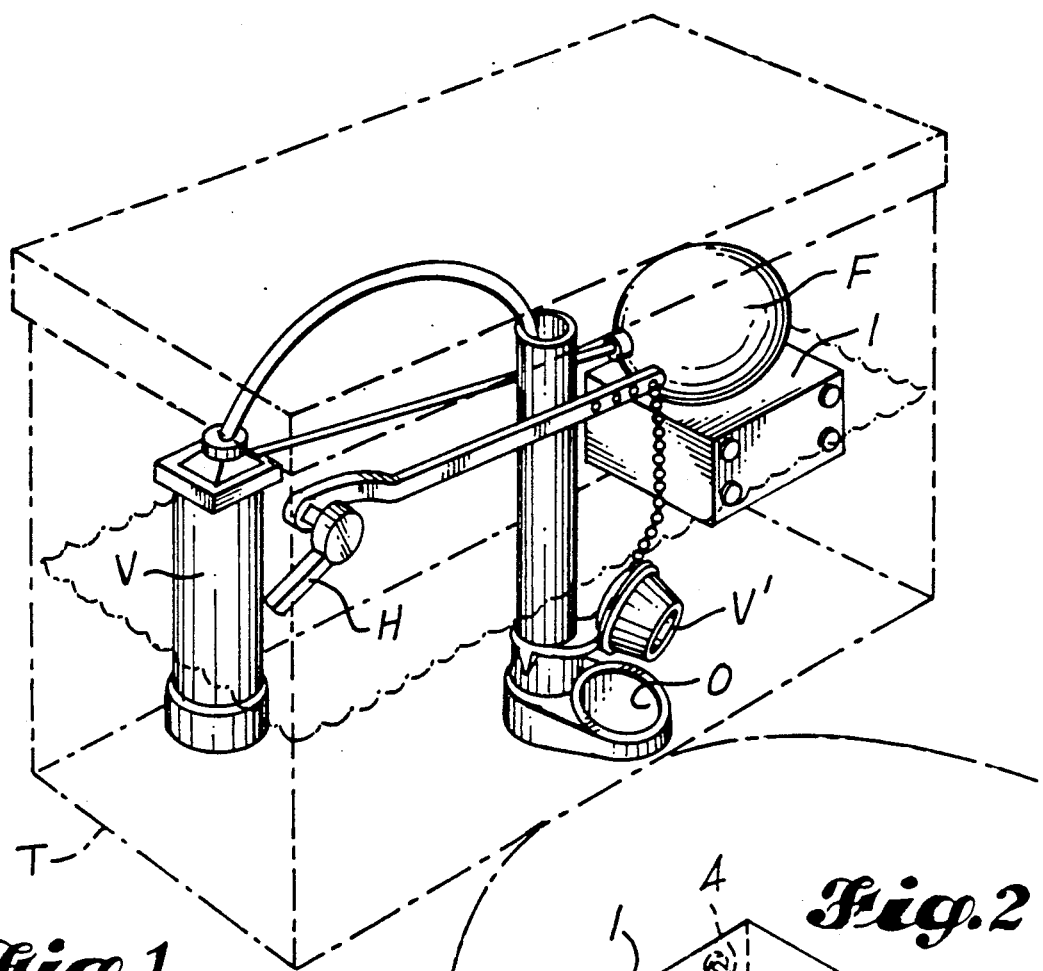
FIG. 1 is a somewhat diagrammatic top perspective of the internal workings of a representative toilet tank construction utilizing a water-saving toilet tank attachment in accordance with the present invention.

FIG. 1 illustrates the components of a representative toilet tank of the type in which the present invention can be used to reduce the amount of water discharged from the tank into the toilet bowl each time the toilet is flushed. Such tank T provides a reservoir for water to be introduced into the toilet bowl to flush it. Tank T includes an internal water supply valve V for introducing water into the tank until the bulb float F reaches a predetermined level at which time the supply of water into the tank is cut off. Handle H can be manipulated to lift a buoyant flapper valve V' which normally closes the outlet 0 leading from the tank to the toilet bowl. The flapper valve remains in the open position illustrated in FIG. 1 as water flows through the outlet 0 until the tank is substantially emptied, whereupon the flapper valve V' closes automatically and water is introduced into the tank through the water-supply valve V until the float F reaches its predetermined position.

In accordance with the present invention, a rigid block 1 of buoyant material is positioned directly below the float F of the water-supply valve V. Consequently, rather than being buoyantly supported directly on the surface of the water in the tank, float F is maintained above the surface of the water a distance determined by the upright dimension or height of the block 1. Accordingly, after each flush the tank is refilled to a lower level than it otherwise would be and a lesser quantity of water is discharged when the flapper valve V' is opened by manipulation of the handle H.

Figure 2:
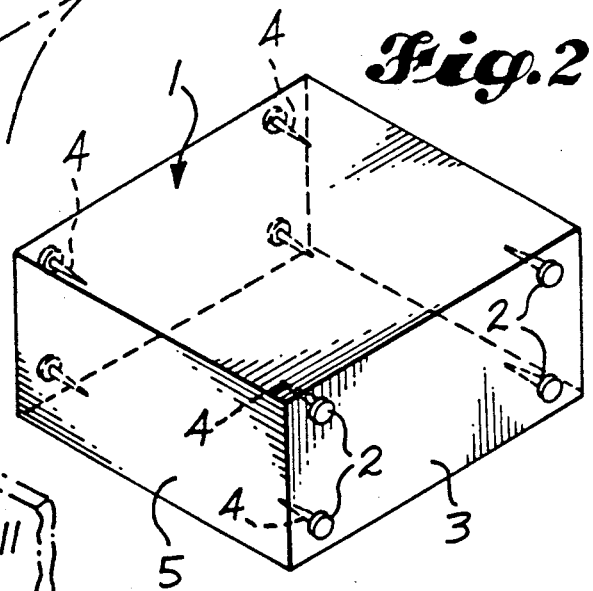
FIG. 2 is a top perspective of a the attachment of FIG. 1.

With reference to FIG. 2, the buoyant block 1 can be a rectangular block of inexpensive, rigid, closed-cell plastic foam which can be cut from a larger sheet or block. The height of the block 1 determines the amount of water discharged at each flush and optimally is selected to achieve the maximum water saving while achieving the minimum discharge of water required to effectively evacuate the toilet bowl. A height of about 3 inches (7.6 cm) has been found to be sufficient in a representative installation.

The width of the block 1 preferably is slightly less than the internal minimum width of the toilet tank so that the block remains approximately centered in the tank with limited ability to cant or tip widthwise of the tank. For a representative tank having a minimum internal width of 6 inches (15.2 cm), the width of the block can be about 5½ inches (14.0 cm).

Preferably the block is at least as long as it is wide for stability. In a representative embodiment, a length of about 6 inches (15.2 cm) has been found to be sufficient.

In the embodiment illustrated in FIGS. 1 and 2, projecting buttons 2 of hard smooth material are located adjacent to each corner of each of the opposite sidewalls 3 of the block 1. Such buttons can be the enlarged heads of plastic or brass brads having shanks 4 inserted into the block at the appropriate locations. Such buttons 2 slide along the interior sidewalls of the toilet tank. Such interior sidewalls commonly are rough unfinished ceramic material which otherwise could fray the sides and edges of the block 1. Similar buttons can be provided on the end walls 5 of the block, or at least the end wall of the block facing the adjacent end wall of the toilet tank.

Figure 3:
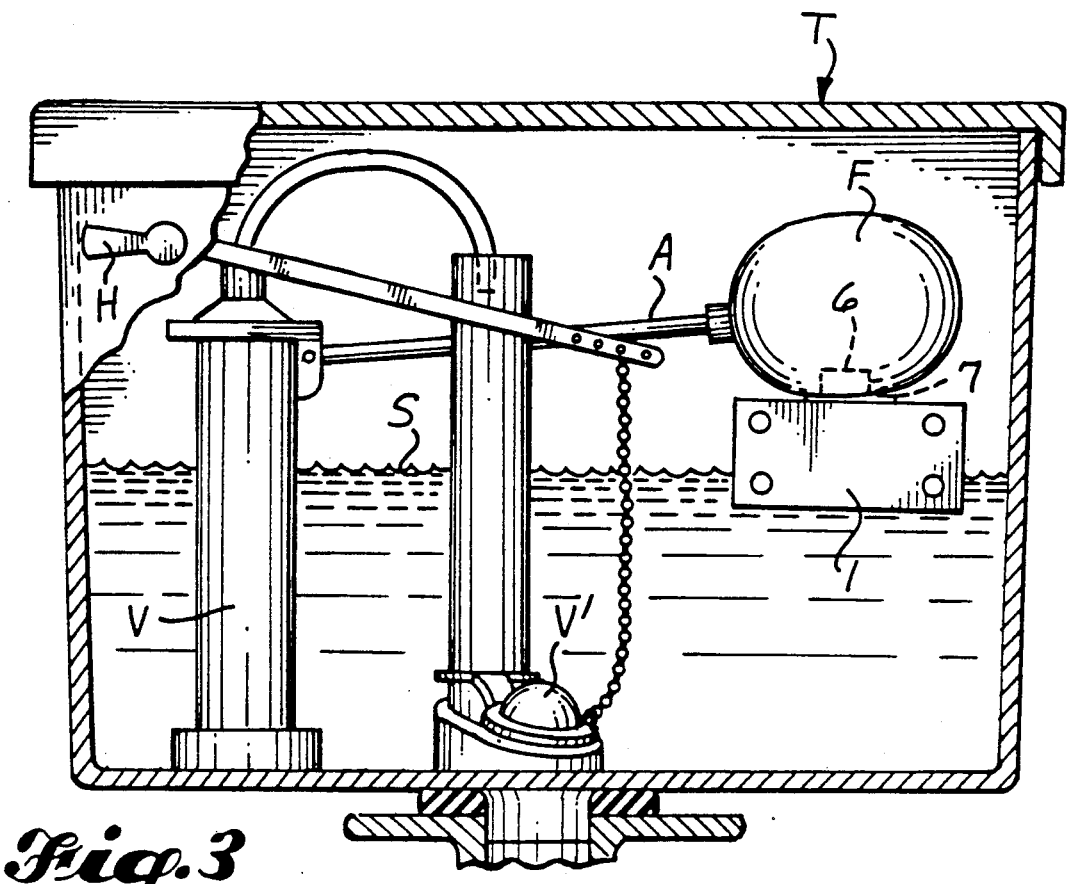
FIG. 3 is a somewhat diagrammatic side elevation of the toilet tank construction of FIG. 1 with parts broken away, and illustrating a modification in broken lines.
Figure 4:
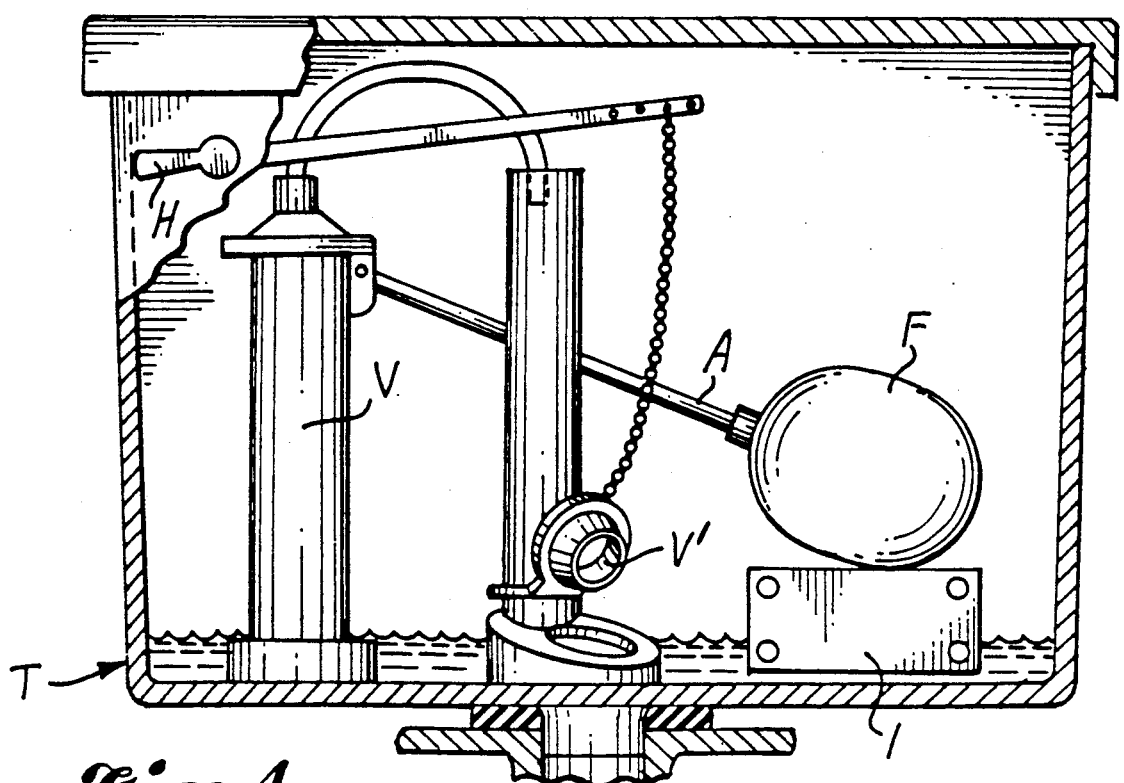
FIG. 4 is a side elevation corresponding to FIG. 3 with parts in different positions.

The general operation of the system in accordance with the present invention is illustrated in FIGS. 3 and 4. As noted above, the float F of the water supply valve V is maintained a predetermined distance above the surface S of the water in the tank T. For stability, preferably the float F is approximately centered between the opposite sides of the tank. For some tank designs the lever arm A on which the float F is supported can be bent to achieve the desired centered relationship of the float F in the tank. With the float approximately centered, in many constructions upward pressure of the buoyant block 1 against the underside of the float F is sufficient to maintain the block 1 reliably centered beneath the float even as the toilet is flushed and the float F lowers as the tank is emptied to the condition illustrated in FIG. 4.

In some constructions, however, the lowermost position of the float F is sufficiently high that downward travel of the float F stops prior to emptying of the toilet tank. In that case the block 1 continues its downward travel and can be disengaged from the underside of the float F. Depending on the size of the block and the arrangement of the internal parts of the toilet tank, it may be desirable to affix the top of the block to the underside of the float F so that the block does not wander from its position substantially centered beneath the float. As indicated in broken lines in FIG. 3, a small patch 6 of suitable fastening material can be secured to the underside of the float F and a complemental patch 7 of fastening material can be secured to the upper surface of the block 1. For example, such patches can be complemental hook-and-pile fastening materials of a strength sufficient to suspend the light block 1 from the float F when the float is in its lowermost position and the level of the water in the tank continues to fall.

Figure 5:
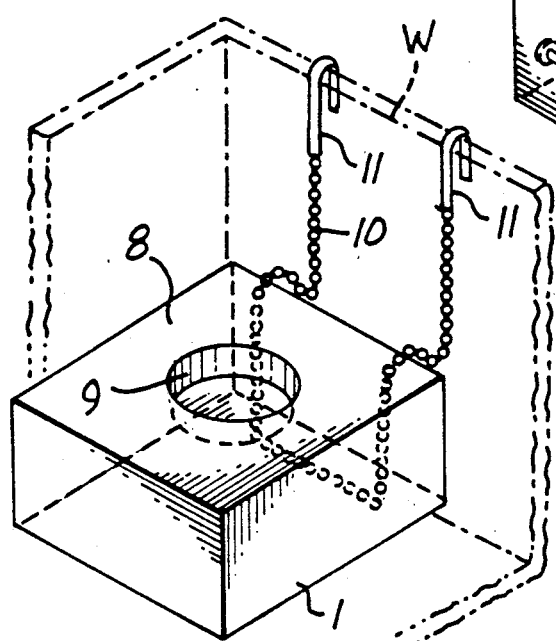
FIG. 5 (on the drawing sheet with FIGS. 1 and 2) is a somewhat diagrammatic top perspective of an alternative water-saving toilet tank attachment in accordance with the present invention.

FIG. 5 illustrates alternative modifications for maintaining the block 1 approximately centered beneath the float. The upper surface 8 of the block 1 can have a concave central depression 9 so that the block is guided toward a central position in which the depression 9 receives the convex exterior of the underside of the float. In addition, the block 1 can be tethered to the adjacent end wall W of the toilet tank by a length of flexible material, such as by a length of beaded chain 10 threaded through the adjacent end portion of the block. The opposite ends of the chain can be connected to thin wires sheathed in resilient tubing 11 such as Neoprene surgical tubing enabling the wire end portions to be bent into hook shape over the top of the end wall W. The degree to which the block 1 can wander from the end wall W when the tank is empty is limited by the tethering chain 10 such that the block remains substantially centered beneath the float.

In many constructions, however, the block can be of rectangular configuration with a planar top surface and without any mechanism for tethering the block to a wall of the tank or mechanism for affixing the block to the float.

Regardless of the embodiment utilized, installation of the block is quick and easy and does not require special tools or mechanical expertise or experience. Another advantage is that the simple water-saving attachment in accordance with the present invention is effective to reduce the amount of water discharged during each flush by the same amount over a long period of use without the possibility of introducing impurities into the water and without requiring modification of the standard toilet tank components, with the possible exception of positioning the float of the water-supply valve substantially centrally between the opposite sidewalls of the tank.

I claim:

1. In a toilet tank construction including a reservoir and a water-supply valve for introducing water into the reservoir and including a float, the water-supply valve being effective to fill the reservoir to a predetermined level determined by the position of the float, the improvement comprising the combination of a buoyant block disposed beneath the float and positioning the float above the surface of the water in the reservoir, and means for tethering said block in the reservoir for maintaining said block approximately centered beneath the float, whereby the predetermined level to which the tank is filled is lower than it otherwise would be if said block were removed.

2. In the construction defined in claim 1, the reservoir including a wall adjacent to the block and having an upper edge, and the tethering means including a length of flexible material connected to the block and having at least one end portion hooked over the upper edge of such wall.

3. A water-saving attachment for a toilet tank construction of the type including a reservoir and a water-supply valve for introducing water into the reservoir and including a float, such water-supply valve being effective to fill the reservoir to a predetermined level determined by the position of the float, said attachment comprising a buoyant block for positioning beneath the float so as to maintain the float a predetermined height above the surface of the water in the tank such that the predetermined level to which the tank is filled is lower than it otherwise would be if the block were removed, and a length of flexible material secured to the block for tethering the block in the reservoir.

4. A method of reducing the amount of water discharged from the tank of a flush toilet into the toilet bowl each time the toilet is flushed which comprises positioning a buoyant block beneath the float of the toilet tank water-supply valve which float determines the predetermined level to which the tank is refilled such that, as the tank is refilled by the action of the water-supply valve, the float is maintained a predetermined distance above the surface of the water in the tank so that the predetermined level to which the tank is refilled is lower than it otherwise would be if the block were removed and a lesser quantity of water is discharged from the tank into the toilet bowl when the toilet is flushed, and including tethering the block in the toilet tank for maintaining the block approximately centered beneath the float.

* * * * *